July 5, 1960  E. D. TIDD  2,944,102
HIGH PRESSURE HERMETICALLY SEALED TERMINAL
Filed Dec. 21, 1956
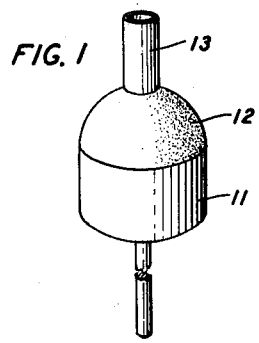
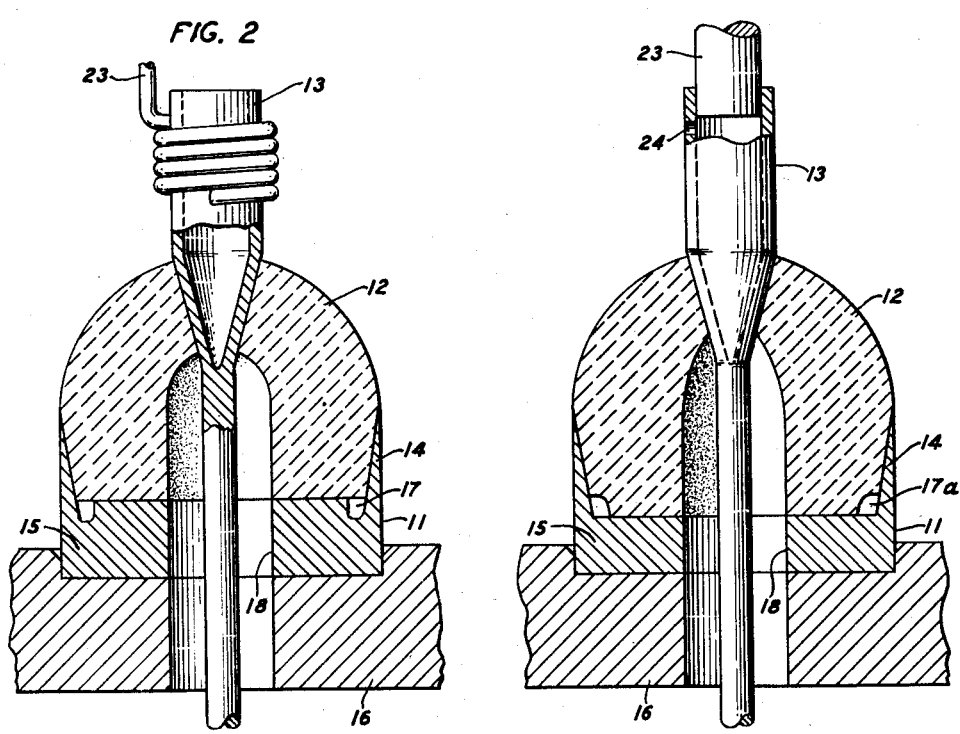
INVENTOR
E. O. TIDD
BY
Walter M. Hill
ATTORNEY

000

United States Patent Office 2,944,102
Patented July 5, 1960

2,944,102

HIGH PRESSURE HERMETICALLY SEALED TERMINAL

Elbert D. Tidd, Clinton, N.J., assignor to Bell Telephone Laboratories, Incorporated, New York, N.Y., a corporation of New York Filed Dec. 21, 1956, Ser. No. 629,880

3 Claims. (Cl. 174—152)

This invention relates to hermetically sealed terminals and in particular to such terminals which are subject to very high pressures, as in deep-sea submarine cables and the like.

In submarine cables employed for the transmission of telephone signals, housings for electrical apparatus, such as repeaters, are often placed at intervals along the length of the cable. As the cable is expected to remain in service for a long period of years, every precaution must be taken to protect the cable against any possible injury or failure that might occur. Because of the very large pressures that a deep-sea submarine cable is subjected to over these many years, the cable must be designed to withstand the ingress of water because of a failure at some point. A plurality of water resistant and water impervious means are therefore provided to protect the electrical housings and to prevent water vapors penetrating the housings or the full or partial sea pressure bearing against the repeater elements. For this purpose, various end seals and glands are employed between the main portion of the cable and the electrical housing, forming a transition portion of the cable. However, it is still possible that even these seals will fail under constant pressure over a large number of years and that water vapor or insulating compound under the full or partial sea pressure will bear against the sealed terminal through which the center conductor of the cable enters the apparatus housing.

It is an object of this invention, therefore, to provide an improved hermetically sealed terminal which is capable of withstanding very large differential pressures for long periods of time.

A further object of the present invention is to extend the life of deep-sea submarine cables by preventing the penetration of water vapors into the electrical apparatus housings.

These and other objects are accomplished in accordance with this invention through the provision of an insulator having a configuration in the form of a domed arch. This shape provides structural strength to the terminal as well as maximum electrical isolation of the lead-in conductor. The insulator configuration coupled with the use of a lead-in conductor sealed within the insulator and tapered in the vicinity of the seal insures substantially pure compressive stresses within the insulator. The insulator is formed of a high alumina ceramic which possesses enormous strength when under pure compressive stresses, thus guaranteeing an effective seal that can withstand high pressures for extensive periods.

In a preferred embodiment of the invention the sealed terminal comprises the aforementioned domed arched insulator sealed in and against the thin, tapering side walls of a base cup member. The base cup member and insulator are formed, respectively, of "Kovar" and a high alumina ceramic, whose coefficients of expansion closely match each other. The cup member and insulator are provided with aligned axial apertures, and a lead-in conductor extends through these apertures and is sealed within the insulator. The lead-in conductor is hollow and tapered at least in the vicinity of the seal.

Other objects and many of the attendant advantages of the invention will be readily appreciated as the same becomes better understood by reference to the following detailed description when considered in connection with the accompanying drawings in which:

Fig. 1 is a perspective view of a sealed terminal in accordance with the present invention;

Fig. 2 is an enlarged sectional view of a sealed terminal illustrative of one embodiment of this invention; and Fig. 3 is an enlarged sectional view of a sealed terminal illustrative of another embodiment of this invention.

Before proceeding with the detailed description of the present invention, reference may be had to the patent to W. T. Read-V. L. Ronci, No. 2,676,197, of April 20, 1954, for a description of a submarine cable and the utility and location of an end seal therein. The sealed terminal of the present invention is mounted and used in much the same manner as the glass seal assembly D of the patent.

Referring now to Fig. 1, the hermetically sealed terminal of this invention comprises essentially three elements, namely a base cup member 11, a ceramic insulator 12 and a lead-in conductor 13. Both the base cup member and the insulator are cylindrical and, as shown in Figs. 2 and 3, the insulator in addition possesses an exterior domed configuration and an interior arch. It has been found that this shape distributes the stresses, formed in the insulator by the external pressure, in such a manner that they are essentially compressive stresses; and, by the selection of an insulator material having a very high compressive strength, this design results in a stable system capable of maintaining high pressure loads for long periods without failure. In existing terminals utilizing insulators of more or less cylindrical block shape, there is a tendency for shear stresses to develop in the insulator along planes which are in line with the surfaces bounding the hole in the base member. By the use of the internal arch, which smoothly communicates with the hole in the base member, these shear stresses are eliminated.

The shape of the insulator in the form of a true domed arch also provides long over-surface paths, both inside and outside, from the lead-in conductor to the base cup member, thereby providing good electrical isolation of the potentials applied to the lead-in conductor.

The ceramic insulator 12 is sealed in and against the thin tapering side walls 14 of base member 11. Preferably, the seal is achieved by a high temperature bonding carried out at temperatures approximately 800 degrees centigrade, using titanium as the metalizing agent. The cup member 11 and the thin tapering side walls 14 enable easy and convenient processing without the introduction of deleterious stresses in the bond or ceramic insulator. The tapered walls aid initially in insuring a proper seating of the insulator in the cup member and in addition the walls are sufficiently thin to permit some degree of deformation or flexing, thus reducing the stresses which would normally be created in the bond as the same cools to room temperature following fabrication. Also, by this construction, any pressure on the bond area from the ceramic insulator is balanced out by the applied pressure acting on the outside of the thin side walls, the walls being separated or removed from contiguous surfaces in much the same manner as is shown in the Read-Ronci patent.

The cup member 11 also comprises a heavy base section 15 which serves to transmit the pressure load from the ceramic insulator 12 to the basic foundation 16. This base section is provided with a hole 18, to allow passage of the lead-in conductor, and is brazed to the basic foundation 16 which in the case of a submarine cable would comprise a metal end plug or the apparatus housing proper.

In the Fig. 2 modification, a groove 17 is provided in the section 15 at the base of the tapered walls 14. This groove serves as a storage space for the bonding alloy used during fabrication of the assembly. During fabrication the terminal assembly is inverted from the position shown in Fig. 2, and after the application of sufficient heat, the bonding alloy, which for example may be pure silver or silver copper eutectic, liquefies and flows down between the inner tapered side walls 14 and the metallized surface of the adjacent ceramic. The groove 17 further serves to increase the yieldability of the thin tapered walls 14 by effectively displacing the fulcrum thereof to thus provide an increased lever arm effect. That is, the height of the tapered walls is increased making the walls more flexible.

The groove 17a, of the Fig. 3 modification, is provided in the insulator 12 adjacent the base of the tapered walls 14. This groove is for the same purpose as the groove 17 of the Fig. 2 modification in that it provides a reservoir for the bonding alloy. In this modification, the thin walls 14 are of the same height as the effective height of the walls of Fig. 2.

The lead-in conductor 13 projects through the insulator 12 and is sealed therein by a high temperature bonding, the conductor being hollow and tapered in the vicinity of the seal. This hollow construction facilitates the stability of the metal-ceramic bond by substantially reducing the stresses which would normally be created therein as the same returns to room temperature after fabrication. The thin walls are capable of yielding plastically during this cooling without breaking or unduly straining the bond area. The taper allows the applied external pressure, acting on the unsupported lead-in, to be unevenly distributed to the insulator in the manner of a keystone and thus serves to keep the bond as well as the insulator in substantially pure compression. In pre-existing terminals it has been found that the external pressure acting on the lead-in conductor or center pin attempts to push it into or through the insulator and, in consequence thereof, tension and shear stresses are set up in the insulator along planes parallel to the lead-in conductor. The use of this tapered lead-in overcomes this action and distributes this external pressure to the insulator as substantially compressive stresses.

With respect to this last-mentioned ceramic-to-metal seal, it will be noted that the arch of the Fig. 3 modification possesses a greater rise than that of Fig. 2. This serves to foreshorten the length of the seal thereby making it easier to fabricate a good bond, without however affecting in any way the structural strength of the terminal.

Figs. 2 and 3 illustrate two manners in which the central conductor 23 of the submarine cable can be attached to the lead-in conductor 13. In Fig. 3 a hole 24 is provided in conductor 13 to permit the inside of the conductor to be open to ambient pressures.

The use of a special ceramic ("alumina") having a temperature coefficient of linear expansion closely matching that of the metal alloys ("Kovar" for the base cup member and molybdenum or "Kovar" for the lead-in) results in an assembly having minimum residual stresses prior to application of the high service loads. A high alumina ceramic is used comprising eighty-five percent or more $Al_2O_3$, while "Kovar" is a well known iron-nickel-cobalt alloy.

In actual use it is not anticipated that the pressure on the sealed terminal will exceed 7,000 pounds per square inch, but because of the extreme care and exceedingly high safety factors that must be employed in the construction of a cable that is to be permanently laid on an ocean floor at great expense and with little anticipation of opportunity to repair it for many years, the ceramic-metal seal assembly must be able to withstand much higher pressures. Sealed terminals such as those disclosed herein have been constructed and have withstood pressures of the order of 30,000 pounds per square inch without failure.

While the foregoing disclosure has set forth the use of this terminal in submarine cables and the like, it is to be understood that the terminal can be used in other and different environments. For example, this terminal can be used in high pressure chemical reaction vessels where it is desirable to incorporate electrical instrumentation within the pressure enclosure.

It is to be understood, therefore, that the above-described embodiments are merely illustrative of the principles and application of the present invention. Numerous other arrangements may be devised by those skilled in the art without departing from the spirit and scope of the invention.

What is claimed is:

1. A high pressure hermetically sealed terminal capable of withstanding pressures of many thousands of pounds per square inch comprising a cylindrical base cup member having a base portion with an axial aperture therein and thin tapering side walls, a cylindrical insulator sealed in said cup member, said insulator having a domed configuration exterior of said cup and an axial bore communicating at one end with said aperture and terminating at the other end in an internal arch, said insulator also having a tapered axial aperture which extends from the apex of said arch to the apex of said dome with gradually increasing diameter, and a lead-in conductor extending through said apertures and said bore and sealed within the insulator in the vicinity of the tapered aperture, the portion of said conductor sealed within the insulator having a taper corresponding to that of said aperture and being hollow.

2. In a submarine cable provided with an end plug at a transitional section of the cable, a high pressure hermetic seal comprising a cylindrical base cup member having a heavy base portion adapted to be secured to said end plug, said cup also having thin tapering side walls and an axial aperture located in said base portion, a cylindrical ceramic insulator bonded in and against the thin tapering side walls of said cup member, said side walls being thin enough to flex with said bond when the same is subjected to stress, said insulator having a domed configuration exterior of said cup and an axial bore communicating at one end with said aperture and terminating at the other end in an internal arch, said insulator also having a tapered axial aperture which extends from the apex of said arch to the apex of said dome with gradually increasing diameter, and a lead-in conductor extending through said apertures and said bore and sealed within the insulator in the vicinity of the tapered aperture, the portion of said conductor sealed within the insulator having a taper corresponding to that of said aperture and being hollow.

3. A high pressure hermetically sealed terminal capable of withstanding pressures of many thousands of pounds per square inch comprising a cylindrical base cup member having a heavy base portion with an axial aperture therein and thin tapering side walls, a cylindrical ceramic insulator bonded in and against the thin tapering side walls of said cup member, said side walls being thin enough to flex with said bond when the same is subjected to stress, a hollow groove in said base portion adjacent the base of said thin tapering side walls for storing the sealing alloy prior to fabrication, said insulator having a domed configuration exterior of said cup and an axial bore communicating at one end with said aperture and terminating at the other end in an internal arch, said bore being of the same diameter as said aperture and communicating smoothly therewith, said insulator also having a tapered axial aperture which extends from the apex of said arch to the apex of said dome with gradually increasing diameter, and a lead-in conductor extending through said apertures and said bore and sealed within the insulator in the vicinity of the tapered aperture, the portion of said conductor sealed within the insulator having a taper corresponding to that of said aperture and being hollow.

References Cited in the file of this patent

UNITED STATES PATENTS

| | | |
|---|---|---|
| 2,125,315 | Ronci | Aug. 2, 1938 |
| 2,170,648 | Baier et al. | Aug. 22, 1939 |
| 2,210,699 | Bahls | Aug. 6, 1940 |
| 2,241,505 | Cuttler | May 13, 1941 |
| 2,676,197 | Read et al. | Apr. 20, 1954 |

FOREIGN PATENTS

| | | |
|---|---|---|
| 559,864 | France | Dec. 5, 1924 |
| 609,881 | France | May 22, 1926 |
| 142,317 | Australia | July 18, 1951 |